United States Patent
Spiess et al.

[11] Patent Number: 5,944,626
[45] Date of Patent: Aug. 31, 1999

[54] EMERGENCY HYDRAULIC CONTROL WITH CONTROL VALVES FOR CONTINUOUSLY VARIABLE TRANSMISSION

[75] Inventors: Ewald Spiess, Vaihingen/Enz; Joachim Luh, Bietigheim-Bissingen; Peter Baeuerle, Ludwigsburg, all of Germany

[73] Assignee: Robert Bosch GmbH, Stuttgart, Germany

[21] Appl. No.: 08/930,146

[22] PCT Filed: Jan. 9, 1997

[86] PCT No.: PCT/DE97/00024

§ 371 Date: Oct. 6, 1997

§ 102(e) Date: Oct. 6, 1997

[87] PCT Pub. No.: WO97/34094

PCT Pub. Date: Sep. 18, 1997

[30] Foreign Application Priority Data

Mar. 13, 1996 [DE] Germany .......................... 196 09 785

[51] Int. Cl.⁶ ................ F16H 59/00; H02P 3/04
[52] U.S. Cl. .............. 474/28; 474/18; 477/48; 477/906
[58] Field of Search ................. 474/28, 18, 70; 251/625.6; 91/433, 469, 461; 60/486, 428; 477/48, 906

[56] References Cited

U.S. PATENT DOCUMENTS

| | | | |
|---|---|---|---|
| 4,543,077 | 9/1985 | Yamamuro et al. | 474/28 X |
| 4,545,265 | 10/1985 | Abo et al. | 477/48 |
| 4,663,991 | 5/1987 | Nakamura et al. | 474/28 X |
| 4,669,336 | 6/1987 | Okada et al. | 477/48 |
| 4,685,357 | 8/1987 | Sawada et al. | 477/48 |
| 5,169,365 | 12/1992 | Friedmann | 474/18 |

FOREIGN PATENT DOCUMENTS 195 19 162 A1 11/1996 Germany.

*Primary Examiner*—John A. Jeffery
*Assistant Examiner*—Marcus Charles
*Attorney, Agent, or Firm*—Michael J. Striker

[57] ABSTRACT

A hydraulic emergency control for a gear-ratio-dependent change in hydraulic fluid pressures in a first and second hydraulic bevel-gear axial adjuster of a continuously variable transmission (10), is provided in which a pump (1) supplies at least the piston chamber (17) of the second axial adjuster, and at least one downstream pressure limiting valve (40) limits the fluid pressure there and moreover from this supply, via a continuous path valve (20), supplies the piston chamber (13) of the first axial adjuster, and the continuous path valve (20) is controlled with the aid of a pressure differential acting on a throttle valve (39) that is downstream of the pump (1) and is integrated with a switching valve (30). The switching valve (30', 30", 30'''), the continuous path valve (20', 20"), and the pressure limiting valve (40', 40", 40''') are each hydraulically triggered via at least one of a plurality of pilot control valves (120, 120'), (140, 140'), (160, 160') and (170, 170') counter to the action of a mechanical or hydraulic actuator disposed on the corresponding controlled valve. With the aid of the pilot control valves, among other things the switching valve is hydraulically controlled in such a way that it detects the control failure from control pressure changes in the system and switches over to an emergency operation mode.

9 Claims, 4 Drawing Sheets

EMERGENCY HYDRAULIC CONTROL WITH CONTROL VALVES FOR CONTINUOUSLY VARIABLE TRANSMISSION

BACKGROUND OF THE INVENTION

1. Field of the Invention

The invention relates to a hydraulic emergency control for a continuously variable transmission.

2. Prior Art

In German Patent Application DE 195 19 162.5, which had not been published by the filing date of the present application, a hydraulic emergency control for an electronically controlled continuously variable transmission (CVT) is described. The CVT that is preferably used in passenger cars has a control unit for emergency operation that assures tension of the transfer means by simple hydraulic means if the electrohydraulic triggering for normal driving operation should fail. These simple hydraulic means are described in conjunction with FIG. 1.

They assure on the one hand startup at full load, for instance, without slippage of the transfer means, and on the other after startup assure gear shifting from a high startup gear ratio to a low overdrive ratio.

The hydraulic valves, which switch over from the normal driving mode to the emergency operation mode, are held in the normal driving mode in the switching and/or control positions necessary for this driving mode with the aid of electromagnetic actuators.

SUMMARY OF THE INVENTION

It is an object of the present invention to provide an improved hydraulic emergency control with preswitching valves of the above-described kind for a continuously variable transmission.

These objects and others which will be made more apparent hereinafter are attained in a hydraulic emergency control for a gear-ratio-dependent change in hydraulic fluid pressure in a first and second hydraulic bevel-gear axial adjuster of a continuously variable transmission, in which a pump supplies a piston chamber of the second hydraulic bevel-gear axial adjuster, at least one downstream pressure limiting valve limits the hydraulic fluid pressure at the at least one downstream pressure limiting valve and the pump supplies a piston chamber of the first hydraulic bevel-gear axial adjuster via a continuous path valve controlled with the aid of a pressure differential acting on a throttle valve integrated in a switching valve downstream of the pump.

According to the invention the hydraulic emergency control comprises a plurality of pilot control valves connected to the switching valve, the continuous path valve and the at least one pressure limiting valve, so that the switching valve, the continuous path valve and the at least one pressure limiting valve are each hydraulically triggered via at least one of the pilot control valves counter to the action of a mechanical or hydraulic actuator associated therewith.

The hydraulic emergency control is needed in order to enable emergency operation of a continuously variable transmission without the support of an electrohydraulic triggering means that is active in the normal driving mode. In the hydraulic emergency control of the invention, among other things, the switching valve, which if the triggering electronics fail switches over from the normal driving mode to emergency operation, is controlled hydraulically such that it changes its switching position on the basis of control pressure changes in the system. For instance, it switches over from the normal driving mode to the emergency operation mode. The pressures used to control the switching valve occur only if the triggering electronics fail or have already failed. As soon as the control pressure changes in the system again correspond to a normal driving situation of the kind existing when the triggering electronics are intact, the switching valve switches back over to the switching position for the normal driving mode. In general, the switching valve is responsible for the activation of an arbitrary function.

With the hydraulic emergency control according to the invention, among other things, the entire electric triggering means for the switching valve described is dispensed with.

Various preferred embodiments of the invention are described in more detail in the following detailed description.

BRIEF DESCRIPTION OF THE DRAWINGS

Three exemplary embodiments of the invention are schematically shown in the drawings, along with the prior art, in the form of hydraulic circuit diagrams and are described in the ensuing description, in which.

DESCRIPTION OF THE EXEMPLARY EMBODIMENTS

Figure 1:
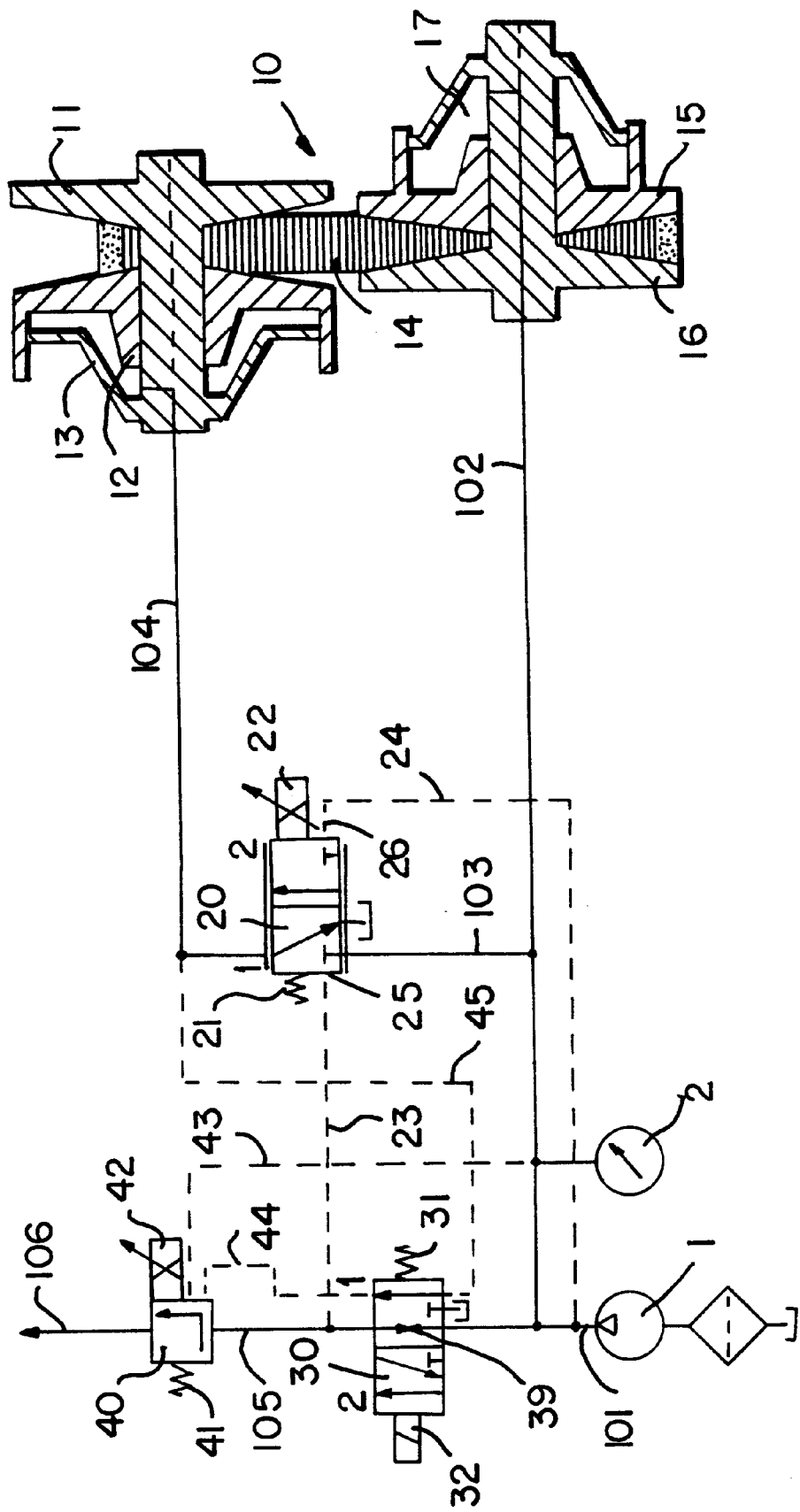
FIG. 1 is a schematic diagram of a hydraulic emergency control of the prior art.

FIG. 1 shows a detail of a hydraulic circuit diagram, corresponding to the prior art, for controlling the hydraulic fluid pressures of the pressure cylinders on the drive and driven sides of a continuously variable transmission. The known continuously variable transmission (10) includes two pairs of bevel gears between which a transfer means (14), such as a prismatic joint belt, chain, V belt or the like, is disposed. Both pairs of bevel gears each comprise two bevel gears (11, 12; 15, 16), which are embodied as braceable hydraulically against one another. The piston and cylinder parts required for this purpose are preferably integrated with at least some of the bevel gears. The piston chambers enclosed by these parts, on the primary side the piston chamber (13) and on the secondary side the piston chamber (17), are acted upon by the respective operating pressure in accordance with the gear ratio established.

In the versions described here, the requisite driven-side secondary pressure is greater than or equal to the requisite drive-side primary pressure. During the normal driving mode, not shown with regard to the valve positions of FIG. 1, the piston chambers (13) and (17) are supplied with hydraulic fluid via a hydrostatic pump (1), driven by the vehicle engine, for instance. The pump (1) pumps the pressure fluid into the secondary-side piston chamber (17) via the service lines (101) and (102).

The primary fluid pressure in the piston chamber (13) is adjusted with the aid of a 3/2-way continuous path valve (20). The primary pressure valve (20), which is supplied from the second service line (102) via a service line (103), is connected to the piston chamber (13) via a service line (104). Along with a hydraulic actuator on both sides, it has a restoring spring (21) on the left and a variable electric actuator (22) on the right. The pressures in the control lines (23) and (24), adapted to the control connections (25) and (26) on the continuous path valve (20), do not affect the electric adjustment of this valve (20), since when the valve (30) is actuated, or in other words with a virtually unthrottled switching position there, they both have the same value.

The pressure in the service lines (101) and (102) and in the piston chamber (17) is detected by means of a pressure sensor (2).

In addition, the hydraulic fluid pumped by the pump (1) flows via a 5/2-way valve (30) and a service line (105) to an externally controlled pressure limiting valve (40). In the normal driving mode, the 5/2-way valve (30) is in switching position 2, and thus the service lines (101) and (105) on the one hand communicate with one another virtually unthrottled, and on the other a control line (44) located between the valves (30) and (40) is relieved to the tank. With the aid of the externally controlled pressure limiting valve (40), which is equipped with an electric actuator (42) on the left and a restoring spring (41) on the right, the secondary pressure is limited and controlled. For the usual hydraulic limitation, the pressure prevailing upstream of the valve (40) is taken from the service line (102) via a control line (43). By means of the variable electric actuator (42), in the normal driving mode, the secondary fluid pressure is dropped to the level required for belt tension in the transfer means (14), in accordance with a predetermined operating state. The hydraulic fluid not needed for the bevel-gear adjustment is carried on to a service line (106) with a lower pressure level. From the service line (106), the hydraulic fluid can be available to other drive components, such as a clutch, converter, or the lubrication system.

If the triggering electronics fail, the valve (30) is moved by its restoring spring (31) into the switching position 1. The hydraulic fluid pumped by the pump (1) is throttled by a throttle valve or aperture control valve (39), acting as a measuring aperture and integrated in the valve (30), and then is diverted via the service lines (105) through the pressure limiting valve (40) and the service lines (106) with the low pressure level. In the pressure limiting valve (40), the electric actuator (42) has failed. Instead, by means of the valve (30) moved into switching position 1, the primary-pressure-dependent external actuator is switched on via the control lines (44), (45). Thus as the primary fluid pressure rises, the secondary fluid pressure is reduced.

In the control lines (23) and (24) connected upstream and downstream of the throttle valve (39), the pressure gradient present there is carried onward to the control inlets (25) and (26) of the primary pressure valve (20).

The precondition here is that the quantity pumped by the pump (1) varies as a function of the rpm, at least in the rpm range relevant for the gear ratio adjustment. The throttle valve (39), the operative surface areas of the slide in the valve (20) in the region of the control inlets (25) and (26), and the restoring spring (21) are all adapted to one another in such a way that the valve (20) is approximately in its middle closing position, at the engine rpm intended for the bevel-gear adjustment. If the engine rpm rises further, then as a consequence of the greater pressure drop at the throttle valve (39) the valve (20) increasingly opens, and as a result hydraulic fluid flows from the service line (103) into the piston chamber (13) via the primary-side service line (104). The gear ratio consequently drops in the direction of "overdrive", until the engine rpm has again reached the set-point rpm intended for the emergency operation mode.

As the engine rpm drops, the slide of the valve (20) moves in the direction of switching position 1, as a result of which the hydraulic fluid can flow out of the piston chamber (13) into the tank. In this case, the gear ratio increases in the direction of "low". Consequently the engine rpm rises again.

In this way, the gear ratio can be adjusted from "low" to "overdrive" while the engine rpm remains approximately constant.

Figure 2:
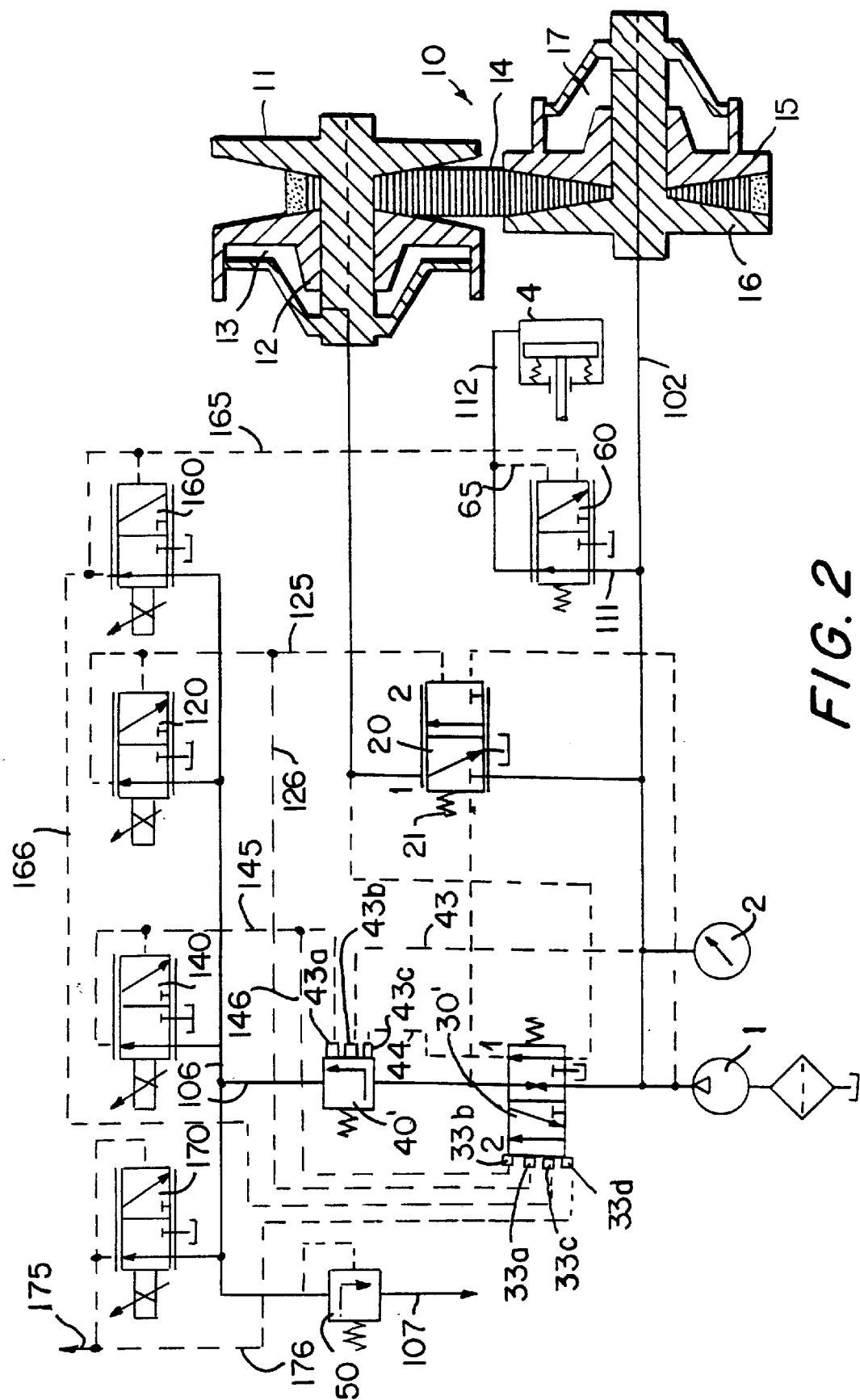
FIG. 2 is a schematic diagram of the hydraulic emergency control of FIG. 1 with electrically actuated pilot control valves, the current supply to which is proportional to the pilot control pressure.
Figure 3:
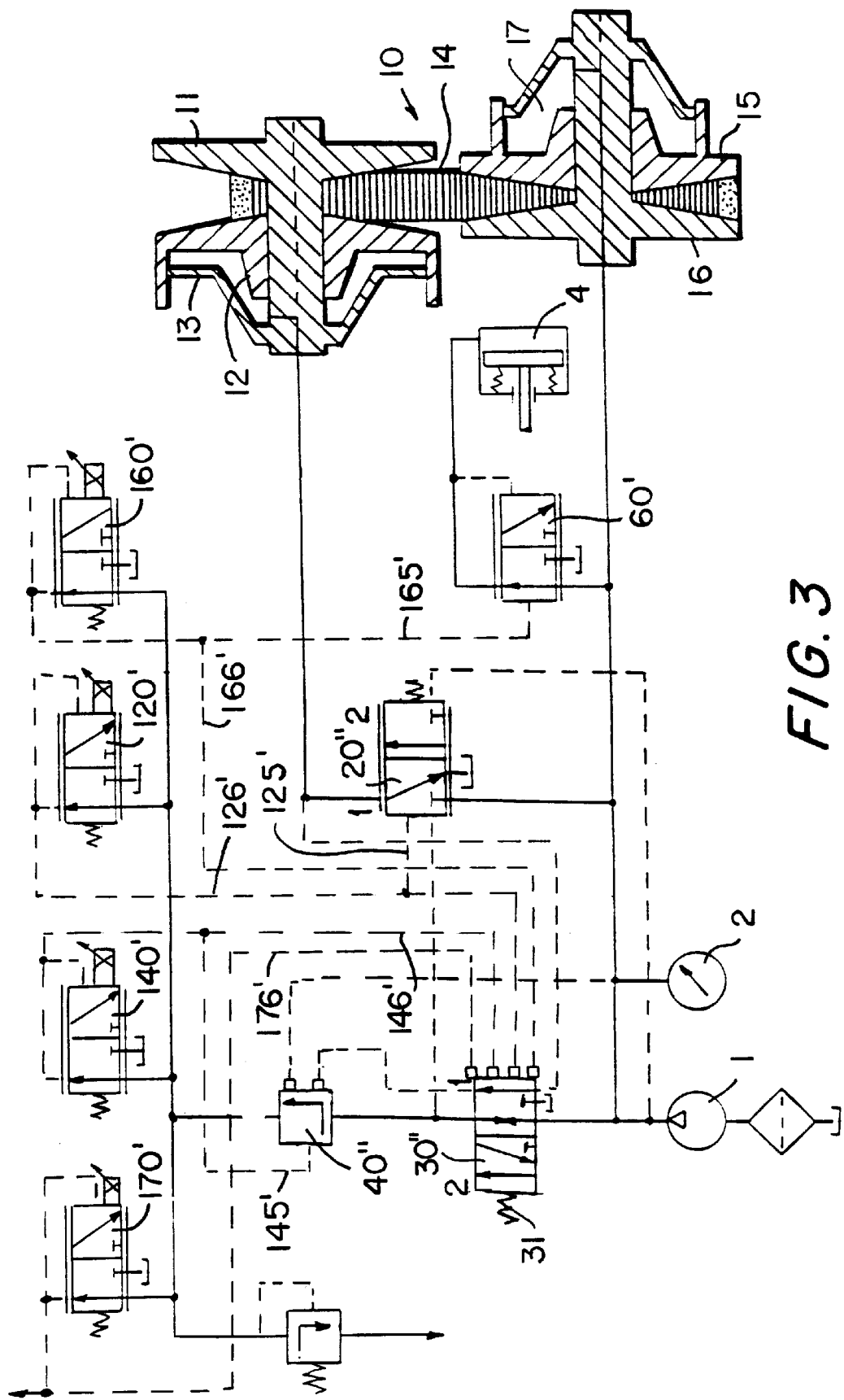
FIG. 3 is a schematic diagram of the hydraulic emergency control of FIG. 2 with pilot control valves whose current supply is inversely proportional to the pilot control pressure.
Figure 4:
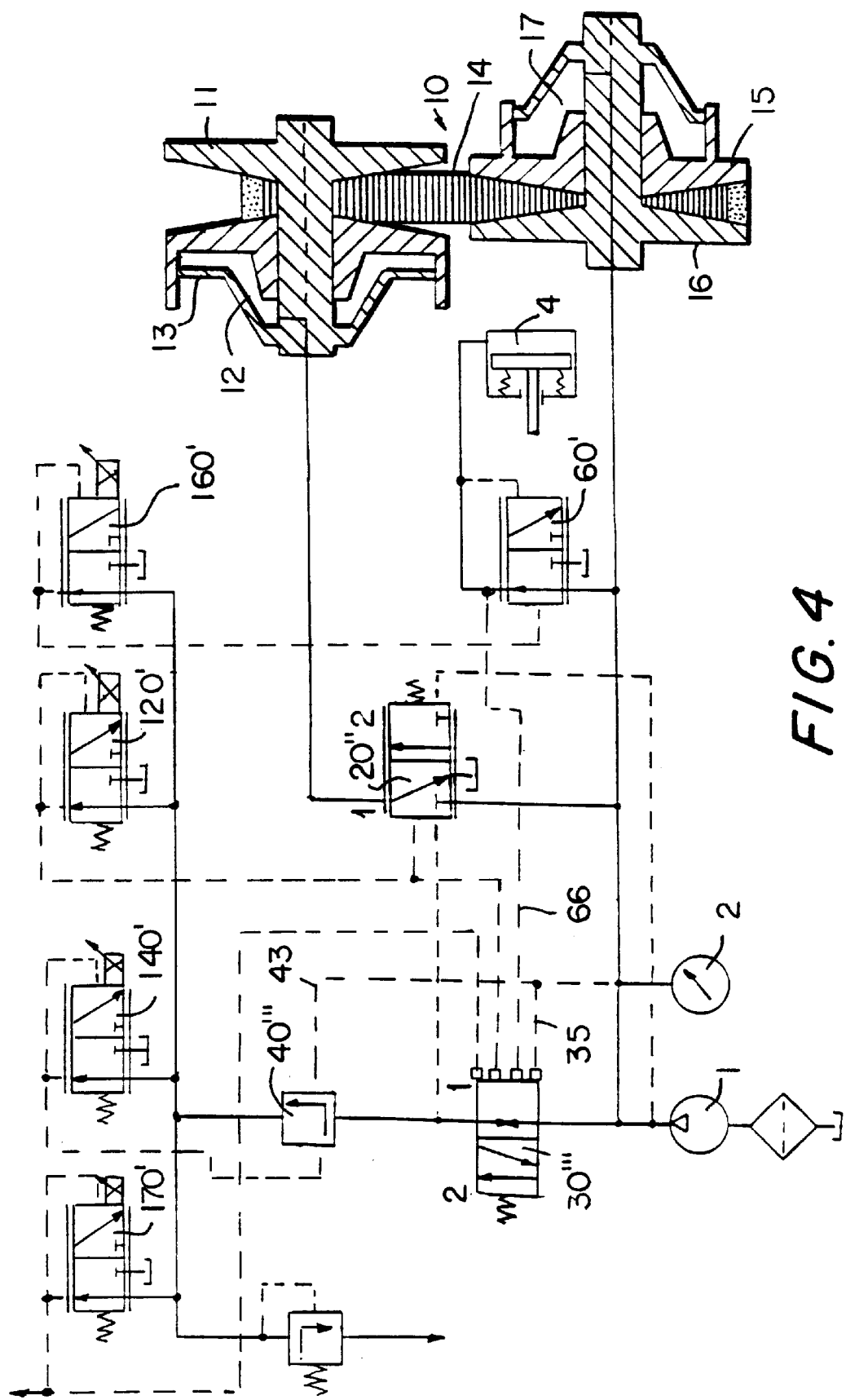
FIG. 4 is a schematic diagram of the hydraulic emergency control of FIG. 3, in which the operating pressure is also used for the pilot control.

In the hydraulic circuit diagrams of FIGS. 2, 3 and 4, the electric actuators of the valves (20), (30) and (40) shown in FIG. 1 are replaced with hydraulic pilot controls. The pilot controls for instance take over hydraulically and electrically actuated pilot control valves (120), (140), (160) and (170). These pilot control valves are 3/2-way continuous path valves. Each pilot control valve has one inflow, one return flow, one service and one control connection. The control connection is located opposite the respective variable electric actuator. For each pilot control valve, the service connection communicates with the control connection. The inflow connections of all the pilot control valves are supplied via the service line (106). A pressure limiting valve (50) is disposed at the end and assures a hydraulic pressure at a medium level in the service line (106).

The service connection of the pilot control valve (140) communicates on the one hand with the valve (40') via a control line (145) and on the other with the valve (30') via a control line (146). The control lines (146), (43) and (44) here end at the valve (40') upstream of separate control faces (43a, 43b, 43c).

The service connection of the pilot control valve (120) likewise communicates on the one hand with the control connection, on the right, of the valve (20') via a control line (125) and on the other with the valve (30') via a control line (126).

From the service line (102), a service line (111) branches off to a further 3/2-way sensor valve (60). The valve (60) serves to trigger a downstream startup clutch (4) to which it is connected by means of a service line (112). The valve (60) is hydraulically urged on its left-hand side here by a restoring spring and on its right-hand face end via two control lines (65) and (165). The control line (65) is connected to the service line (112). The second control line (165) leads to the service connection of the pilot control valve (160). A control line (166), by way of which the valve (30') is hydraulically pilot-controlled, is connected to the same service connection.

The fourth pilot control valve (170), shown in FIG. 2, is used for triggering a torque converter lockup clutch, or some other hydraulically actuated structural group (not shown). To that end, two control lines (175) and (176) lead away from the service connection of the pilot control valve (170). The latter of these control lines is connected to the left-hand face end of the valve (30').

Four hydraulic actuators, with the symbolically shown control faces (33a–33d) are located on the left-hand face end of the valve (30'). By way of example, each control line (126, 146, 166 and 176) arriving there meets a certain control face, and the control lines do not communicate hydraulically with one another. Each individual pilot control pressure exerts a pilot control force on the slide of the valve (30'), and these individual forces add up to a total force.

The pilot control valves (120), (140), (160) and (170) have a rising pressure characteristic curve, if the pressure controller current is rising. They may be embodied for instance as slide pressure controllers, flat-seat pressure controllers, and/or pulse-width modulated pressure controllers, for example, among other forms. During the normal driving mode, the electric actuators of the pilot control valves (120), (140), (160) and (170) are supplied with current such that the control pressures acting on the control faces (33a–33d), disposed on the left face end of the valve (30'), via the control lines (126, 146, 166 and 176), keep the valve in its switching position 2.

Also, for the valve (20'), the force exerted by the control pressure prevailing in the control line (125) is in equilibrium with the spring force of the restoring spring (21).

If the triggering electronics fail, then the electric actuator of the pilot control valves (120), (140), (160) and (170) fails, causing the control pressures in the control lines (126), (146), (166) and (176) drop to minimum values. The valve (30') is moved by its restoring spring (31) into the switching position (1), thus switching over to the emergency operation mode.

FIG. 3 shows a hydraulic circuit diagram with pilot control valves (120'), (140'), (160') and (170'). The valves each have restoring springs on the left, for instance, while on their opposite sides there is a combination of electrical and hydraulic actuation. The control pressure for the hydraulic actuation of the downstream valves is taken in each case from a control line leading away from the respective service connection. The control lines (126'), (146'), (166') and (176') all lead for instance to the right-hand face end of the valve (30"). The restoring spring (31) is located on the opposite face end. The control lines (125'), (145') and (165') that lead away from the pilot control valves come to an end, for the valves (20"), (40") and (60'), on the face ends on which the restoring springs are disposed in each case in the valves (20'), (40') and (60) of FIG. 2.

At least for the valves (40") and (60'), the hydraulic actuation replaces the mechanical actuation. In the case of valve (20"), the hydraulic and mechanical actuation trade places in terms of the face ends where they are disposed, compared with the valve (20') of FIG. 2.

The pilot control valves (120'), (140'), (160') and (170') have a decreasing pressure characteristic curve if the pressure controller current is rising. If the electric current supply fails, the pressure in the control lines (126'), (146'), (166') and (176') rises to the respective maximum limit value, so that the emergency valve (30") changes over to the switching position (1), counter to the force of the restoring spring (31).

FIG. 4 shows a hydraulic circuit diagram in which the valve (30''') that switches over between the normal and the emergency operation mode is only partly triggered via pilot control valves. These are the pilot control valves (120') and (170'). A control line (35), which us supplied from the control line (43), is also connected to the right-hand face end of the valve (30'''). The control lines (35) and (43) are under secondary pressure. In addition, the valves (30''') is triggered with the hydraulic pressure prevailing at the startup clutch (4), via the control line (66). Other hydraulic structural groups may also furnish other triggering pressures for controlling the valve (30''').

In contrast to the valves (30') and 30"), the valve (30''') switches only between an open and a throttled position.

Instead of the mechanical spring restoring means, which can optionally be adjustable with regard to the spring rate, in the case of the valves shown in FIGS. 2, 3 and 4 it is also possible partly to use hydraulic actuators. Moreover, the control lines leading to the valves (30'), (30") and (30''') may be united not only at these valves, but at virtually arbitrary points upstream of these valves. In that case, for the united control lines, the forces effected by the pilot control pressures do not add up.

We claim:

1. A hydraulic emergency control for a gear-ratio-dependent change in hydraulic fluid pressure in a first and second hydraulic bevel-gear axial adjuster of a continuously variable transmission, in which a pump supplies a piston chamber of the second hydraulic bevel-gear axial adjuster, at least one downstream pressure limiting valve limits the hydraulic fluid pressure at said at least one downstream pressure limiting valve and said pump supplies a piston chamber of the first hydraulic bevel-gear axial adjuster via a continuous path valve controlled with the aid of a pressure differential acting on a throttle valve integrated in a switching valve downstream of the pump, wherein said switching valve, said continuous path valve and said at least one pressure limiting valve each have a mechanical or hydraulic actuator;

said hydraulic emergency control comprising a plurality of pilot control valves (120,120'), (140,140'), (160, 160') and (170,170') connected to said switching valve, said continuous path valve and said at least one pressure limiting valve, whereby said switching valve, said continuous path valve and said at least one pressure limiting valve are each hydraulically triggered via at least one of said pilot control valves counter to the action of said mechanical or hydraulic actuator associated therewith.

2. The hydraulic emergency control as defined in claim 1, further comprising separate control lines connecting said switching valve with the respective pilot control valves and a pilot control fluid carried in said separate control lines so as to act on respective control faces of said switching valve.

3. The hydraulic emergency control as defined in claim 1, wherein the at least one pressure limiting valve has separate control faces acted on with an external control fluid.

4. The hydraulic emergency control as defined in claim 1, wherein said switching valve is connected to at least two of the pilot control valves, whereby said switching valve is jointly triggered by said at least two of the pilot control valves.

5. The hydraulic emergency control as defined in claim 1, wherein said at least one pressure limiting valve consists of two pressure limiting valves connected by a service line and said pilot control valves are supplied with hydraulic fluid via said service line.

6. The hydraulic emergency control as defined in claim 1, wherein each of said pilot control valves is an electrically and hydraulically actuated 3/2-way continuous path valve and said pilot control valves each have a single service connection communicating hydraulically with a single separate control connection of a respective one of said actuators.

7. The hydraulic emergency control as defined in claim 1, wherein the pilot control valves are each an electrically and hydraulically actuated 3/2-way continuous path valve with a spring restoration means and each have a single service connection communicating hydraulically with a respective single separate control connection opposite the respective spring restoration means.

8. The hydraulic emergency control as defined in claim 1, wherein said switching valve and said continuous path valve each have an adjustable restoring spring.

9. The hydraulic emergency control as defined in claim 1, wherein said at least one pressure limiting valve each have an adjustable restoring spring.

* * * * *